United States Patent
Brown et al.

(10) Patent No.: US 6,798,970 B1
(45) Date of Patent: Sep. 28, 2004

(54) AUTOMATED PLACEMENT OF OPTICAL FIBERS

(75) Inventors: Robert Brown, Boca Raton, FL (US); Jeffrey E. Leclaire, Boca Raton, FL (US); Huizong Lu, Coral Springs, FL (US); John L. Sullivan, Boca Raton, FL (US)

(73) Assignee: Zygo Corporation, Middlefield, CT (US)

( * ) Notice: Subject to any disclaimer, the term of this patent is extended or adjusted under 35 U.S.C. 154(b) by 161 days.

(21) Appl. No.: 10/085,625

(22) Filed: Feb. 26, 2002

Related U.S. Application Data

(60) Provisional application No. 60/271,518, filed on Feb. 26, 2001.

(51) Int. Cl.[7] .............................. G02B 6/00; B25B 11/00
(52) U.S. Cl. .......................... 385/147; 385/137; 269/21
(58) Field of Search ........................... 385/52, 134–137, 385/147; 269/21, 902, 903; 248/683, 309.3, 346.02, 362, 353, 363

(56) References Cited

U.S. PATENT DOCUMENTS

| | | | |
|---|---|---|---|
| 4,854,667 A | * | 8/1989 | Ebata et al. ................. 385/134 |
| 5,135,590 A | * | 8/1992 | Basavanhally et al. ....... 156/64 |
| 5,173,959 A | | 12/1992 | Cambriello |
| 5,185,846 A | | 2/1993 | Basavanhally et al. |
| 5,194,105 A | * | 3/1993 | Nguyen ....................... 156/293 |
| 5,506,928 A | * | 4/1996 | Evans et al. ................. 385/136 |
| 5,568,892 A | | 10/1996 | Basavanhally |
| 5,700,987 A | | 12/1997 | Basavanhally |
| 5,871,559 A | | 2/1999 | Bloom |
| 5,926,594 A | | 7/1999 | Song et al. |
| 6,003,341 A | | 12/1999 | Bloom |
| 2002/0131729 A1 | * | 9/2002 | Higgins, III ................. 385/91 |

FOREIGN PATENT DOCUMENTS

| | | |
|---|---|---|
| JP | 56077814 A2 | 6/1981 |
| JP | 63113508 A2 | 5/1988 |
| JP | 3216606 A2 | 9/1991 |
| JP | 7056073 A2 | 3/1995 |
| JP | 9145947 A2 | 6/1997 |

\* cited by examiner

*Primary Examiner*—John D. Lee
*Assistant Examiner*—Sarah Song
(74) *Attorney, Agent, or Firm*—Fish & Richardson P.C.

(57) ABSTRACT

An apparatus for placing a fiber on a substrate, the apparatus including a base, a supporting member attached to the base, a first placement head attached to the support member, the first placement head having an extendable plunger slidably coupled to the first placement head, the first placement head having an airflow channel formed proximate to a tip of the plunger, a substrate carrier attached to the base, wherein, during operation of the apparatus, the substrate carrier holds a substrate beneath the plunger mechanism, and wherein, during operation of the apparatus, a vacuum source is connected to the placement head to draw a flow of air through the airflow channel, and wherein, during operation of the apparatus, the placement head picks up and holds a fiber against the plunger tip using forces associated with the flow of air.

28 Claims, 13 Drawing Sheets

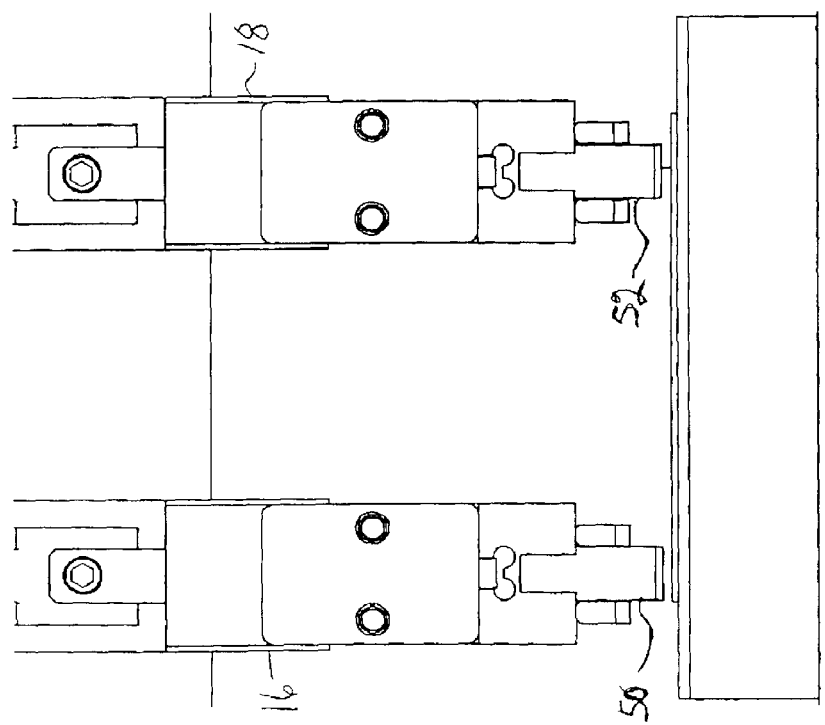

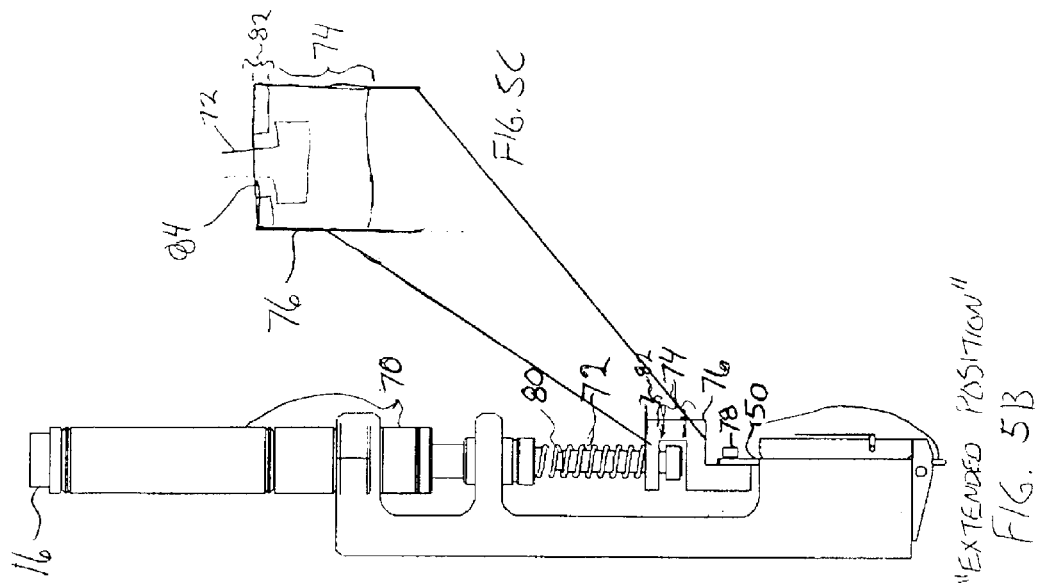
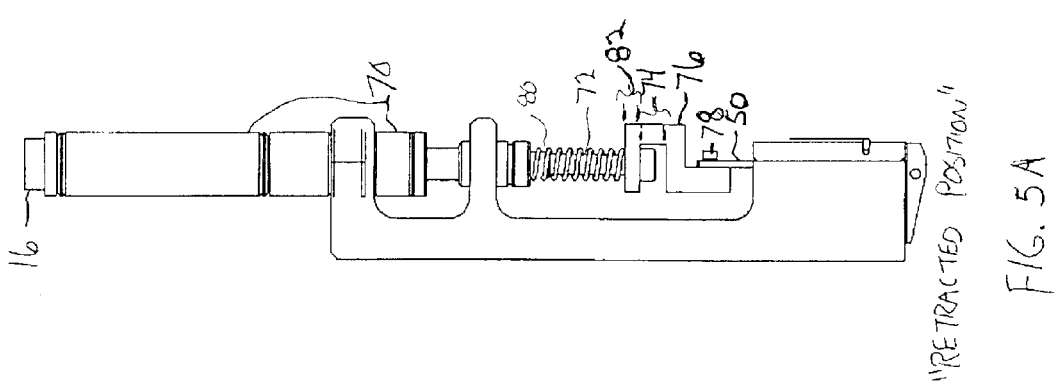

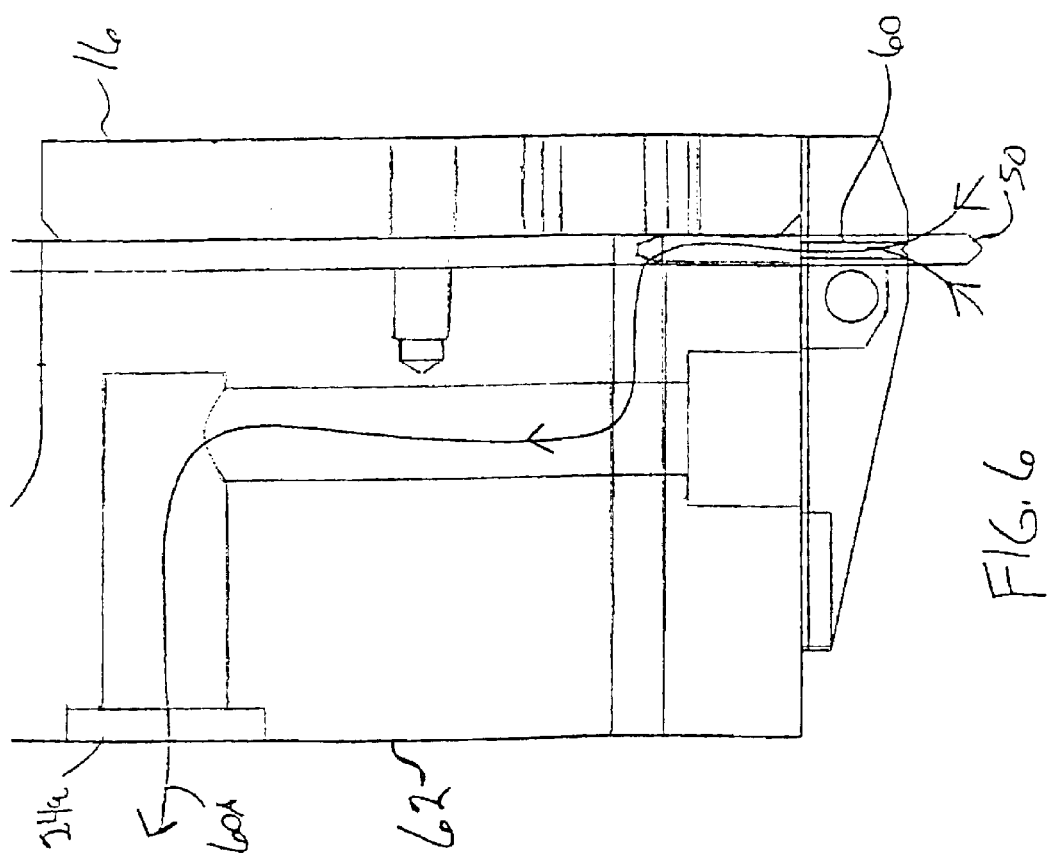

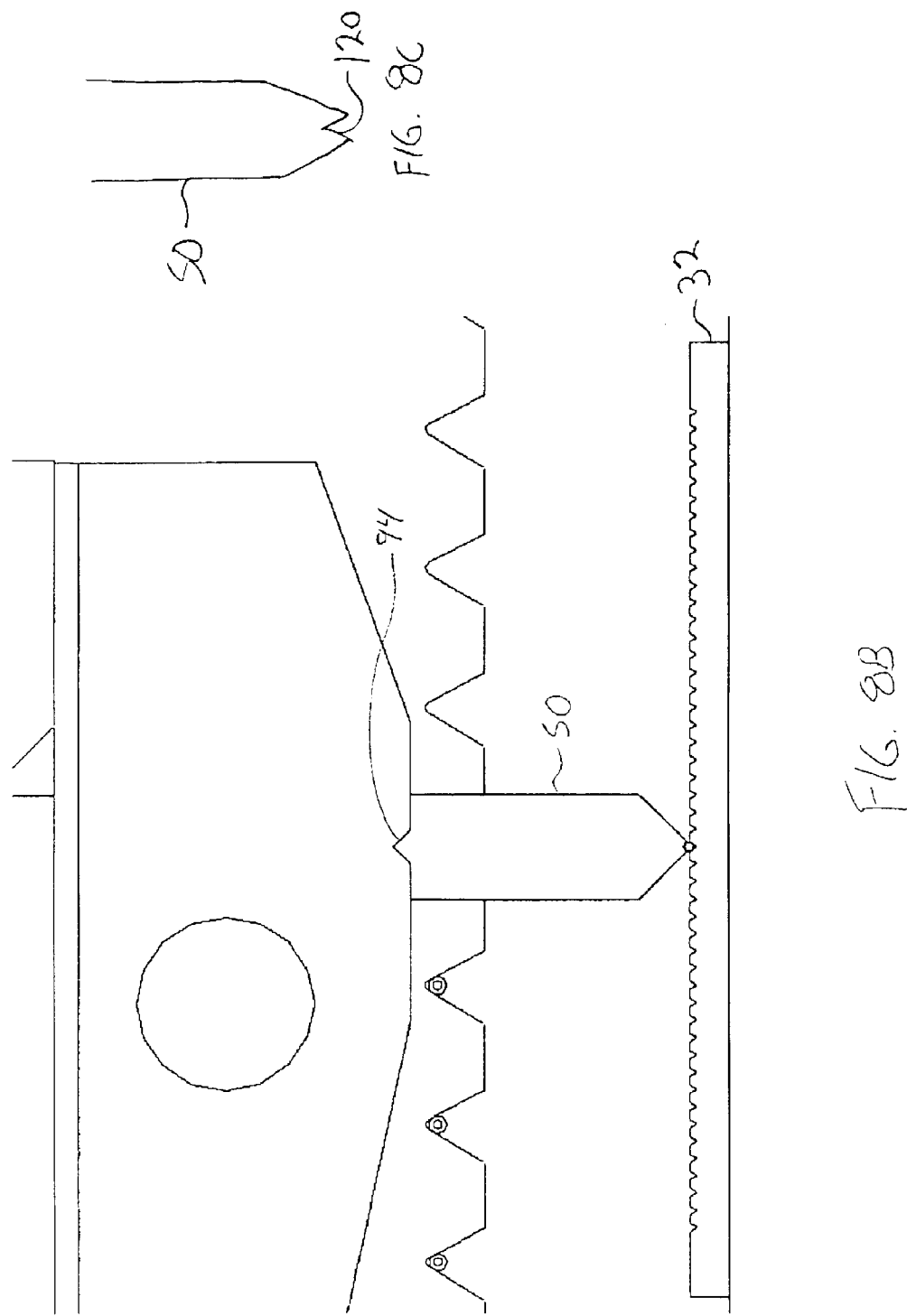

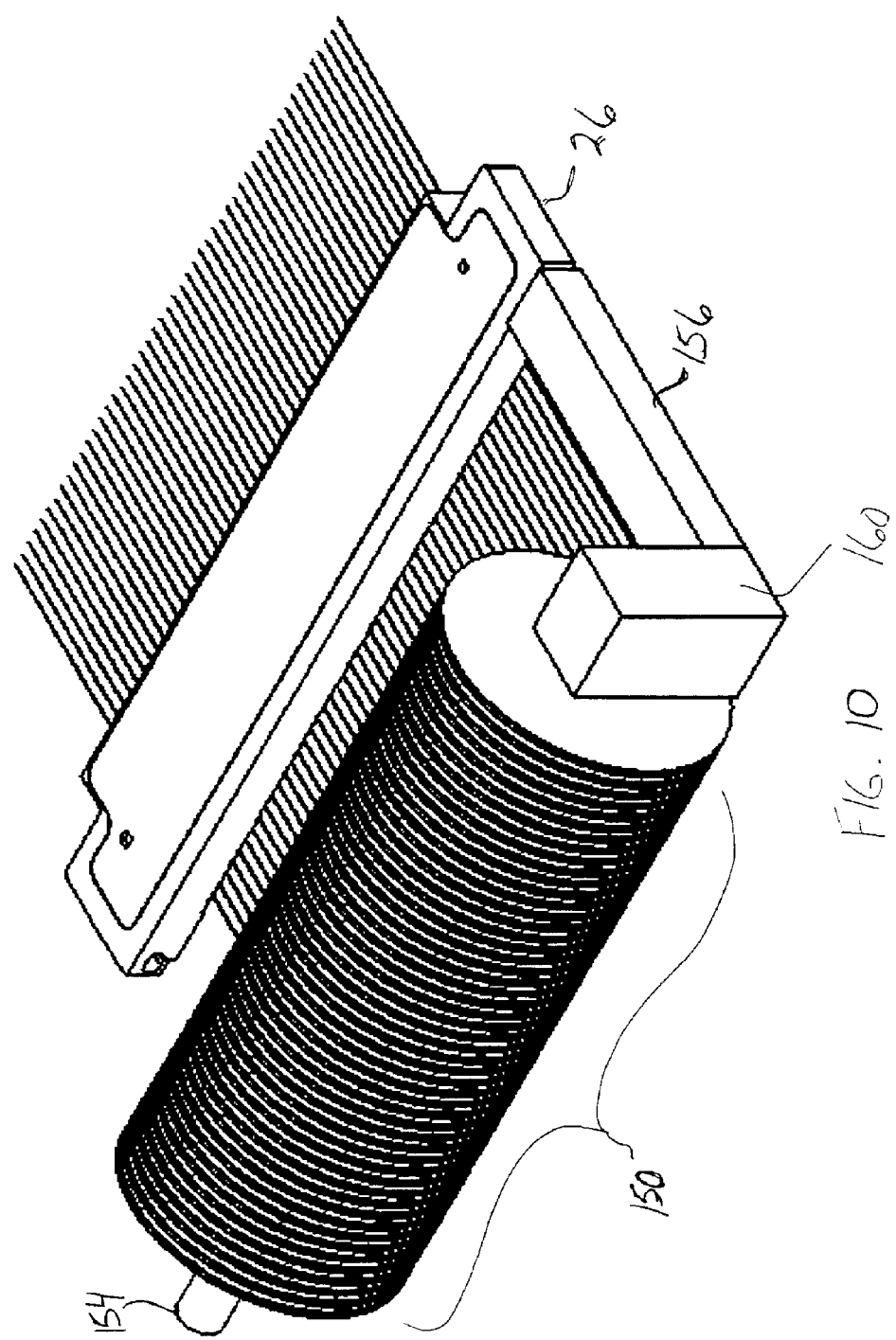

AUTOMATED PLACEMENT OF OPTICAL FIBERS

CLAIM OF PRIORITY

This application claims priority under 35 USC §119(e) to U.S. Patent Application Ser. No. 60/271,518, filed on Feb. 26, 2001, the entire contents of which are hereby incorporated by reference.

TECHNICAL FIELD

This invention relates to handling, aligning and placing fibers onto a substrate.

BACKGROUND

It is often desirable to align multiple fibers into an array of parallel fibers. One method of accomplishing this is to place fibers into parallel grooves that have been formed in the surface of a substrate. Typically, the placement of the fibers into the grooves is performed manually and requires careful and precise operations by skilled operators. In some cases, it is desirable to align multiple "etched" fibers, i.e., fibers that have been stripped of their outer protective coatings and then etched to reduce the outer diameter of the fiber.

SUMMARY

According to an aspect of this invention, an apparatus for placing a fiber on a substrate, includes a base, a supporting member attached to the base, a first placement head attached to the support member, the first placement head having an extendable plunger slidably coupled to the first placement head, the first placement head having an airflow channel formed proximate to a tip of the plunger, a substrate holder attached to the base, wherein, during operation of the apparatus, the substrate holder holds a substrate beneath the plunger mechanism, and wherein, during operation of the apparatus, a vacuum source draws a flow of air through the airflow channel, and wherein, during operation of the apparatus, the placement head picks up and holds a fiber against the plunger tip using forces associated with the flow of air.

One or more of the following features may also be included: grooves formed in a surface of the substrate. A movable stage configured to move beneath and perpendicular to the first placement head, and wherein, during operation of the apparatus, the longitudinal axis of the substrate grooves are held parallel to the longitudinal axis of the fiber and the plunger. A removable substrate pallet, wherein during operation of the apparatus, the substrate is held on the substrate pallet and the substrate pallet is held on the substrate carrier. A fiber holder attached to the supporting member, wherein during operation the fiber holder holds a fiber between the plunger mechanism and a substrate groove, and wherein the fiber holder holds the fiber in longitudinal alignment with the plunger tip and the substrate groove. A groove-shaped tip, wherein during operation of the apparatus, the fiber is drawn against the groove-shaped tip by forces associated with the flow of air through the first placement head. A second placement head attached to the support member, the second placement head having a second extendable plunger slidably coupled to the second placement head, the second placement head having a second airflow channel formed proximate to a tip of the second plunger, wherein the second plunger is longitudinally aligned with the fiber held by the fiber holder and the grooves of the substrate held by the substrate holder, the second extendable plunger further including a groove-shaped tip, wherein during operation of the apparatus, the vacuum source draws a flow of air through the second airflow channel and the second placement head picks up a section of the fiber and holds the fiber within the groove-shaped tip of the second plunger by forces associated with a flow of air through the second placement head. Wherein the fiber holder comprises a movable stage configured to move perpendicular to the first placement head. Wherein the fiber holder also includes a removable fiber magazine, wherein during operation of the apparatus, the fiber magazine holds a plurality of fibers and the fiber magazine is held on the fiber holder. Wherein the fiber magazine also includes a plurality of grooves formed in a bottom surface of the magazine, each of the plurality of grooves holding one of the plurality of fibers, and at least one airflow hole formed in the bottom of each of the plurality of grooves, wherein during operation of the apparatus, a vacuum source draws a flow of air through the airflow holes and holds each of the plurality of fibers within a corresponding one of the plurality of grooves.

According to a further aspect of this invention, an apparatus for handling optical fibers, includes a fiber magazine having a plurality of grooves formed in a surface of the magazine, wherein during operation of the apparatus, each of the plurality of grooves holds one of the plurality of fibers, at least one airflow hole formed in the bottom of each of the plurality of grooves, wherein during operation of the apparatus, a vacuum source draws a flow of air through the airflow holes, the forces associated with the flow of air holding the fibers within the plurality of grooves.

One or more of the following features may also be included: wherein the fiber magazine also includes an airflow plenum formed in a central region of the magazine, the airflow plenum connected to one or more of the airflow holes formed in the grooves, wherein, during operation of the apparatus, a vacuum source draws air from the plenum and from the airflow holes. Wherein, during operation of the apparatus, an end of each of the plurality of fibers is held protruding beyond a front edge of the fiber magazine, and wherein, each time the end of a fiber is placed by the apparatus the corresponding fiber being held in the corresponding magazine groove is dislodged from the magazine groove. Wherein the fiber magazine comprises a removable fiber magazine. The apparatus may also include an axle for holding spools, wherein during operation, at least one spool is placed on the axle, each spool holding an opposite end of a fiber that is being held within one of the plurality of grooves, wherein the spools are removable from the fiber magazine.

According to a further aspect of this invention a method of placing a fiber on a substrate, including holding a substrate having a groove beneath a first placement head, flowing air past a plunger slidably coupled to the first placement head, picking up and holding a fiber against a tip of the plunger using forces associated with the flow of air, and extending the plunger to place the fiber into the substrate groove.

One or more of the following features may also be included: Moving the substrate with a first movable stage, the first movable stage configured to move beneath and perpendicular to the first placement head. Wherein holding a substrate having a groove also includes holding a longitudinal axis of the substrate groove parallel to the longitudinal axis of the fiber and the plunger. Wherein moving the substrate with a movable stage also includes holding the substrate on a removable substrate pallet, and holding the removable substrate on the first movable stage. Also holding a fiber between the plunger mechanism and the substrate in longitudinal alignment with the plunger tip and the substrate groove. Wherein picking up and holding a fiber against a tip of the plunger also includes picking and holding a fiber against a groove-shaped tip. Wherein flowing air also includes flowing air through a channel formed proximate to the groove-shaped tip, and drawing air through the channel during operation of the apparatus. Also including holding the substrate having a groove beneath a second placement head, flowing air past a second plunger slidably coupled to the second placement head, picking up and holding a fiber against a tip of the second plunger using forces associated with the flow of air, and extending the plunger to place the fiber into a second substrate groove. Wherein holding a fiber also includes holding a fiber with a fiber magazine, and moving the fiber magazine with a movable stage configured to move perpendicular to the first placement head. Also includes holding a plurality of fibers with the fiber magazine.

According to a further aspect of this invention, a method of presenting optical fibers to an apparatus includes holding a plurality of fibers within a plurality of grooves formed in a surface of a fiber magazine, wherein holding also includes drawing air through at least one airflow hole formed in the bottom of each of the plurality of grooves, the forces associated with the flow of air being used to hold the fibers within the plurality of grooves.

One or more of the following features may also be included: Wherein drawing air also includes drawing air through an airflow plenum formed in a central region of the fiber magazine, the airflow plenum connected to one or more of the airflow holes formed in the grooves. Wherein holding a plurality of fibers also includes holding an end of each of the plurality of fibers to protrude beyond a front edge of the fiber magazine, and dislodging a fiber from a one of the plurality of grooves each time an end of the corresponding fiber is manipulated by the apparatus. Also including mounting at least one spool proximate to the fiber magazine, each spool holding an opposite end of a fiber that is being held within one of the plurality of grooves, wherein the spool is removable from the fiber magazine.

Embodiments of the invention may have one or more of the following advantages. For example, the apparatus automates the placement of fibers onto a substrate, which reduces the time required to place fibers and eliminates the manual handling of the fibers during placement. The use of an airflow or vacuum to supply, locate and place a fiber and the use of a compliant grooved tip plunger to place the fiber minimizes the forces applied to the fiber which reduces the possibility of damage to the fiber. Also, some of the embodiments allow for aligning a set of etched fibers into a "fan-out" pattern, i.e., placing a set of etched fiber ends within a set of narrowly-spaced grooves formed in a substrate, and positioning the larger diameter sections of the same set of fibers into a more widely-spaced pattern in an area away from the grooves. Also, some of the embodiments use spools to hold the trailing lengths of each fiber placed onto a substrate which simplifies the handling of fibers attached to the substrate, eliminates direct handling of the fibers and is amenable to further automation.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 shows an enlarged view of the bottom sections of the placement heads as shown in FIGS. 1–3;

FIG. 5A shows an enlarged front view of a placement head in a retracted position;

FIG. 5B shows an enlarged front view of a placement head in an extended position;

FIG. 5C shows an enlarged view of slotted coupling member shown in FIGS. 5A–5B;

FIG. 6 show an enlarged cross-sectional view of the bottom section of the placement head shown in FIGS. 4–5B;

FIG. 8B shows an enlarged view of the bottom of a placement head in an extended position as shown in FIG. 5B;

FIG. 8C shows an enlarged view of the tip of the plunger shown in FIGS. 8A–8B;

FIG. 10 shows a view of a fiber magazine as shown in FIGS. 1 and 3;

Like reference symbols in the various drawings indicate like elements.

DETAILED DESCRIPTION

Figure 1:
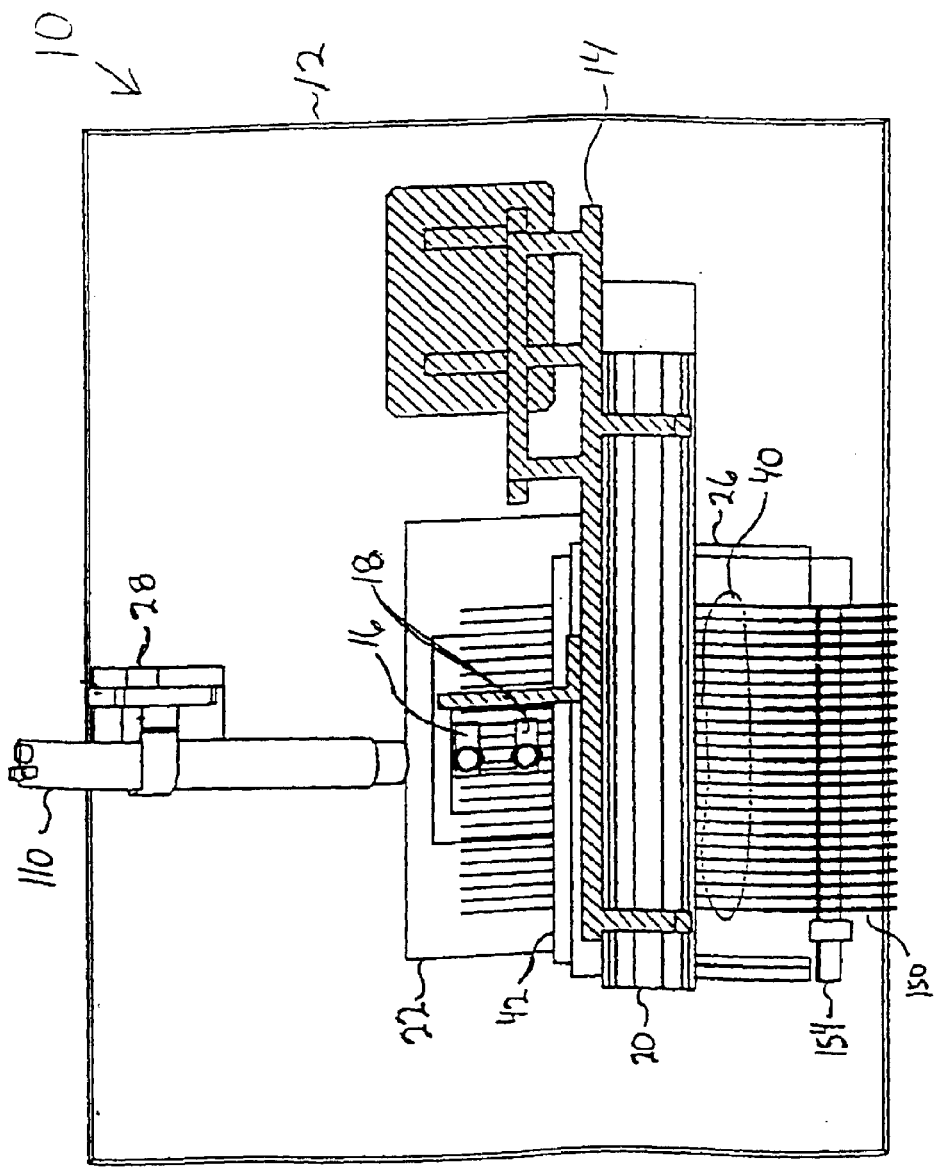
FIG. 1 shows a top view of a fiber placement apparatus.
Figure 2:
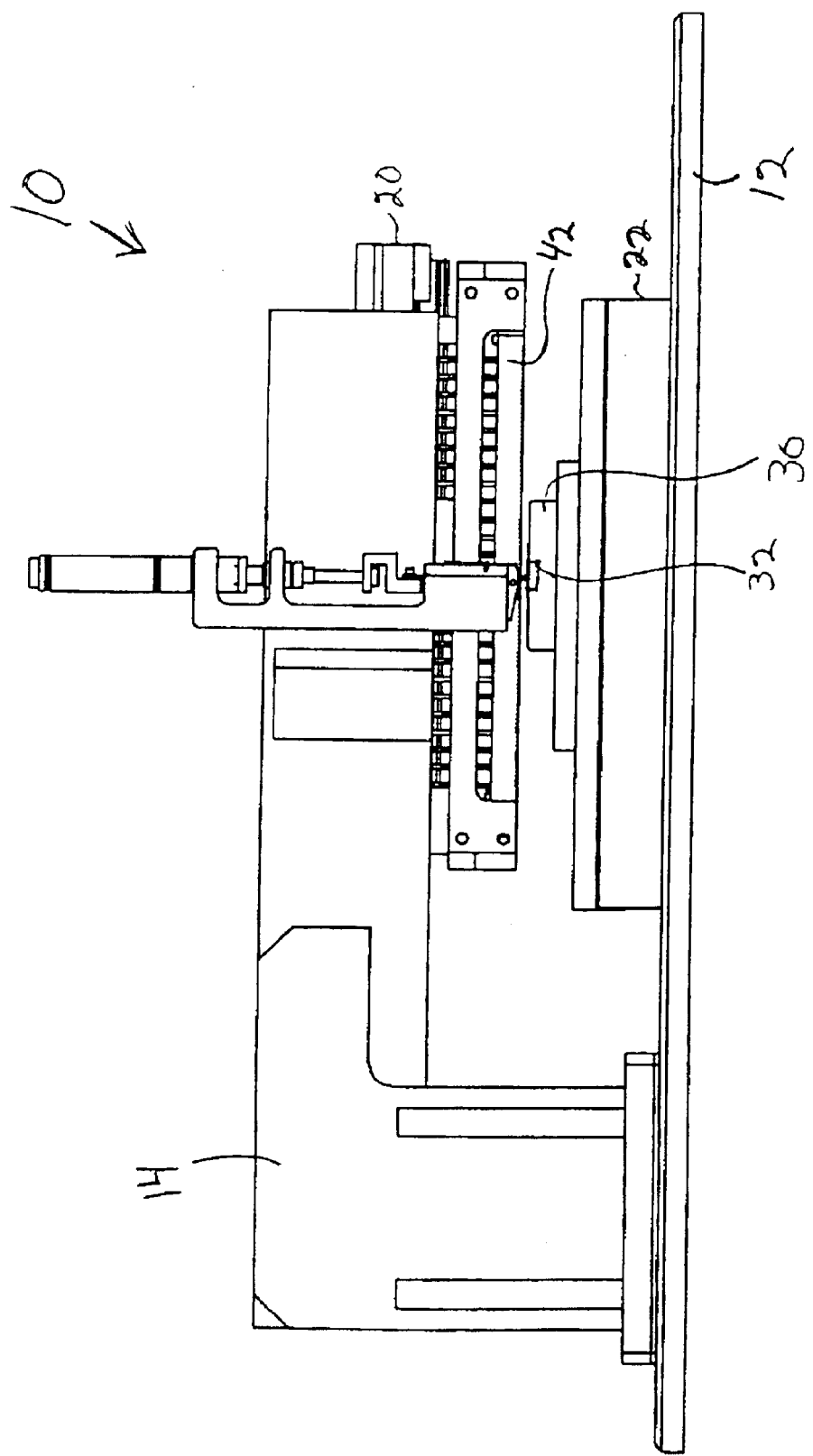
FIG. 2 shows a front view of the fiber placement apparatus.
Figure 3:
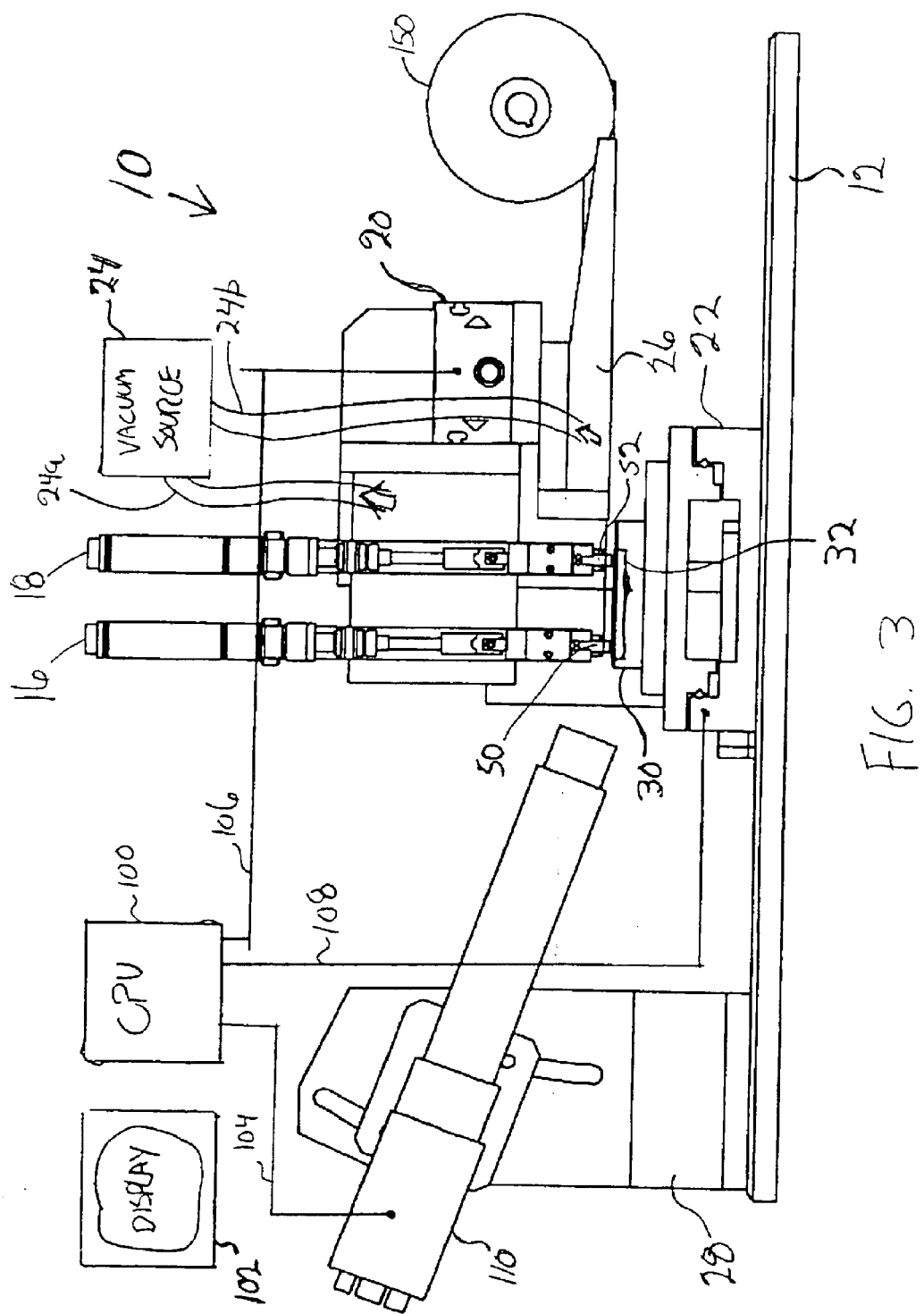
FIG. 3 shows a side view of the fiber placement apparatus.

Referring to FIGS. 1–3, a fiber placement apparatus 10 automates the placement of individual fibers onto a substrate by moving the substrate and the fibers beneath a set of vacuum placement heads that pickup and then place individual fibers onto the substrate. Apparatus 10 includes a base 12, an overhead support member 14 mounted on base 12, two placement heads 16 and 18 mounted to support member 14, a fiber magazine carrier 20 mounted to support member 14, a substrate carrier 22 mounted to base 12 and a vacuum source 24 connected by airflow connects 24a and 24b to draw air through the placement heads and fiber magazine, respectively. To operate apparatus 10, a substrate pallet 30 holding a grooved substrate 32 is loaded onto substrate carrier 22. A "pre-loaded" fiber magazine 26 holding fibers 40 with an end of each fiber ("fiber tips") extending just beyond a front edge 42 of fiber magazine 26 is loaded onto magazine carrier 20. Both fiber magazine carrier 20 and substrate carrier 22 are constructed from "single-axis stages", i.e., automated platforms ("stages") that are movable in a single-axis, in this case, allowing fiber magazine carrier 20 and substrate carrier 22 to move perpendicular to the longitudinal axis of the fibers that are held in fiber magazine 26. Now also referring to FIGS. 4–5B, placement heads 16 and 18 each include an extendable "knife" plunger 50 and 52, respectively, which extends and retracts perpendicular to the plane of movement of substrate 32 and fibers 40, and is also longitudinally aligned with fibers 40 held in fiber magazine 26. Each plunger 50 and 52 has a groove-shaped tip that is used to hold a fiber as it is placed into a substrate groove. To place a fiber with apparatus 10, substrate 32 is moved by substrate carrier 22 until a groove formed in substrate 32 is aligned with the placement position and longitudinal axis of plungers 50 and 52. Fiber magazine 26 is then moved by fiber magazine carrier 20 until a fiber tip is aligned with and held beneath plungers 50 and 52 and also aligned with and held above the substrate groove. Now also referring to FIGS. 6–7, vacuum source connector 24a draws a flow of air 60a through a channel 60 that is formed within the bottom section of placement head 16 (placement head 18 is constructed to operate similarly). Channel 60 is formed through to a set of entry points 90 and 92 near the exit/entry point of plunger 50 (and plunger 52 in placement head 18). The resulting flow of air near the plungers 50 and 52 draws the fiber tip up and into the bottom of each placement head 16 and 18 and aligned to the groove-shaped tip of each plunger 50 and 52. The plungers 50 and 52 are then extended and the fiber is placed into the substrate groove. The fiber is held in place within the substrate groove by a "tacking" adhesive at which point plungers 50 and 52 are retracted. The vacuum source may be implemented as vacuum pump or as a "Bernoulli effect" vacuum generator, for example.

The construction of placement head 16 is shown in greater detail in FIGS. 5A–7. Placement head 18 is constructed similarly. Placement head 16 includes a pneumatic cylinder 70 having a central piston 72 that is connected to slotted coupling member 76. Slotted coupling member is connected to an upper end of plunger 50 by pin 78. A compression spring 80 surrounds piston 72 and is interposed between the body of cylinder 70 and slotted coupling member 76. As shown in FIG. 5A, in a retracted position piston 72 is retracted into cylinder 70. In this position, piston 72 contacts slotted coupling member 76 on an upper section 82 and against the force of spring 80. Therefore, plunger 50 is held inside the bottom of fiber placement head 16, in the retracted position. As shown in FIGS. 5B–5C, cylinder 70 has been actuated to the extended position. In the extended position the bottom of piston 72 is no longer in contact with section 82 of slotted coupling member 76 and has moved relative to the slotted coupling member through slot 84. In the extended position coupling member 76 and plunger 50 have moved downwards until their movement is stopped by plunger 50 coming in contact with substrate 32.

Figure 7:
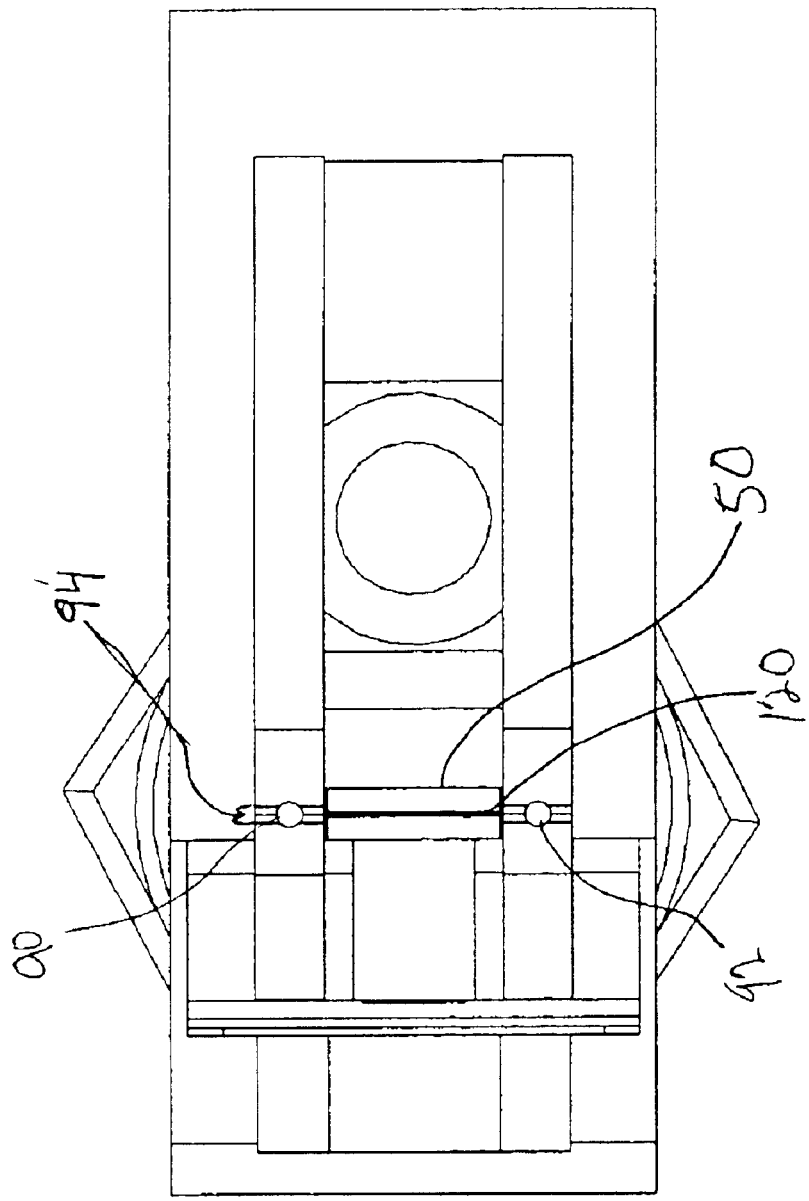
FIG. 7 shows a view of the bottom of the placement heads shown in FIGS. 4–5B.
Figure 8A:
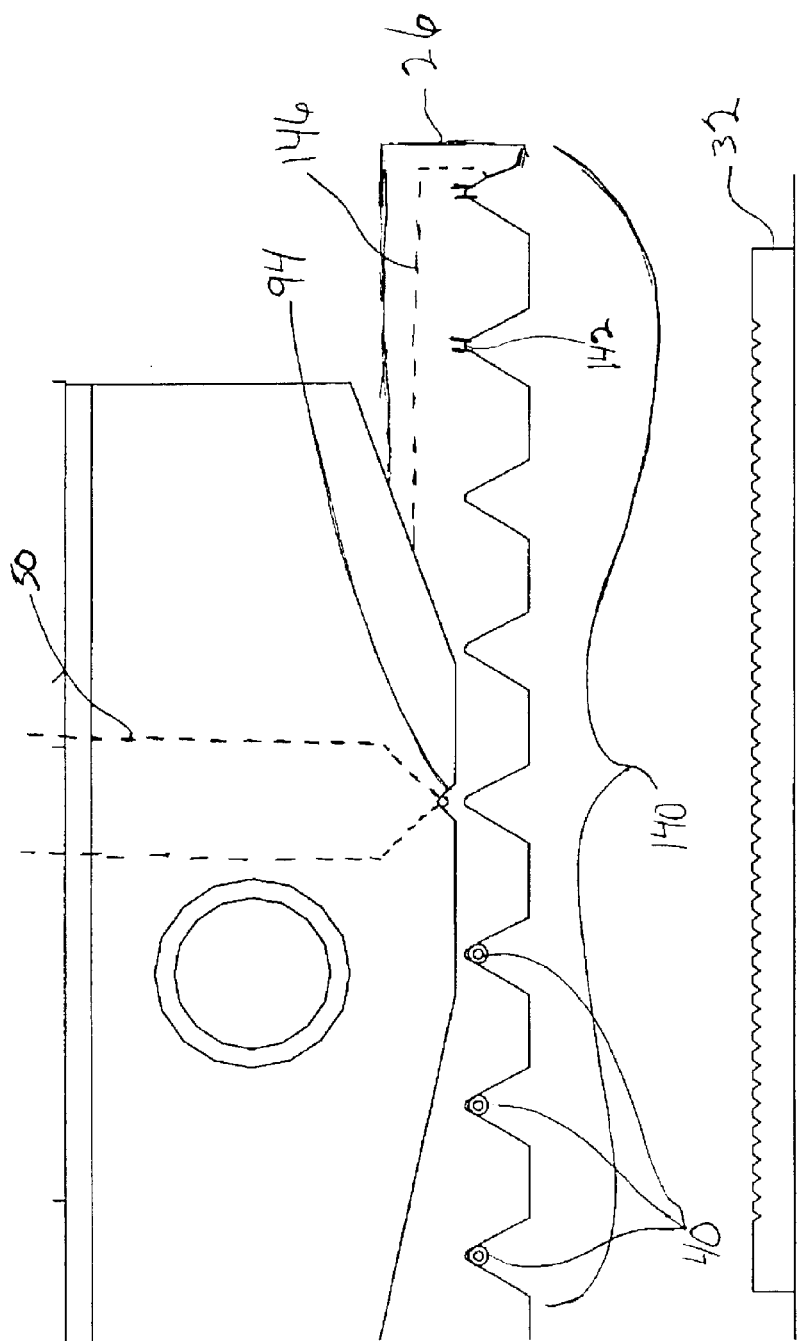
FIG. 8A shows an enlarged view of the bottom of a placement head in the retracted position as shown in FIG. 5A.

Placement head 16 includes an airflow channel 60 that allows air to be drawn from the bottom section of head 16 and out the side of head 16. As shown in FIG. 7, air entry points 90 and 92 are formed on either side of plunger 50 in the bottom section of head 16. Vacuum source 24 is connected by connector 24a to draw air 60a from the side of each head through channel 60 and from air entry points 90 and 92. Referring to FIGS. 7, 8A–8C, the bottom section of placement head 16 includes a fiber alignment slot 94 that is aligned with the longitudinal axis of the tip of plunger 50. Fiber alignment slot 94 allows a fiber held beneath placement head 16 to be drawn up by the flow of air through air entry points 90 and 92 and to contact the tip of plunger 50. FIG. 8C shows a groove 120 formed length-wise across the tip of plunger 50 that is used to hold the fiber in the longitudinal center of the plunger 50 during placement. Plunger 52 includes a groove 120a that is formed in the same manner as groove 120.

Apparatus 10 includes a computer processor 100 (CPU 100) that has a display device 102, a memory, executable programs, and input/output capabilities. CPU 100 is connected by output lines 106 and 108 to output control signals that control the movements of fiber magazine carrier 26 and substrate carrier 20, respectively. Apparatus 10 includes a camera 110 mounted to support member 28 that has a focus point next to the fiber placement area beneath placement heads 16 and 18. CPU 100 is also connected by input line 104 to camera 110 to receive image inputs from camera 110. To operate apparatus 100, an operator enters a starting command to CPU 100 (e.g., by typing a keyboard or selecting an active region on display with a mouse) causing CPU 100 to execute a program that allows the operator to enter further commands to control the movements of substrate carrier 22, fiber magazine carrier 20 and placement head plungers 50 and 52. During use of apparatus 10, image inputs received by CPU 100 from camera 110 are displayed as a visual image on display device 102, which the operator watches to determine the stage position for proper alignment of substrate groove to the placement position of plungers 50 and 52. The operator enters a first movement command to cause the computer processor to move substrate carrier 22 under placement heads 16 and 18 until a substrate groove is aligned under plungers 50 and 52. The operator then enters a second movement command to cause fiber magazine 26 to be moved until one of the fiber tips is aligned under plungers 50 and 52 and above the substrate groove. Airflow through channels 60 and entry points 90 and 92 causes air to be drawn from beneath each of the placement heads 16 and 18, and creates a differential pressure that is lower above the fiber tip and higher below the fiber tip. The differential forces created by the flow of air causes the fiber tip to be drawn into fiber alignment slot 94 and into alignment with the grooved-tips of plungers 50 and 52. The flow of air is continued during the placement operation to hold the fiber tip in the plunger grooves 120 and 120a.

At this point, with the fiber tip being held in the grooved-tips of plungers 50 and 52 by the forces associated with the airflow, the operator enters a command to CPU 100 that causes plungers 50 and 52 to be extended towards substrate 32. Plungers 50 and 52 are extended until they contact the substrate and push the fiber tip into a substrate groove (see FIG. 8B). The placed fiber end is held within the substrate groove by a tacking adhesive that is applied to the substrate grooves before the substrate is aligned beneath the placement heads. The operator enters a command to CPU 100 that causes plungers 50 and 52 to be retracted back into placement heads 16 and 18, respectively. If more than one fiber is to be placed on substrate 32, the described placement procedure is repeated until the desired number of fibers are placed into additional substrate grooves (referred to hereafter as a "populated substrate"). A populated substrate may then be removed from apparatus 10 by issuing commands to move substrate carrier 22 away from the placement heads 16 and 18.

Figure 9A:
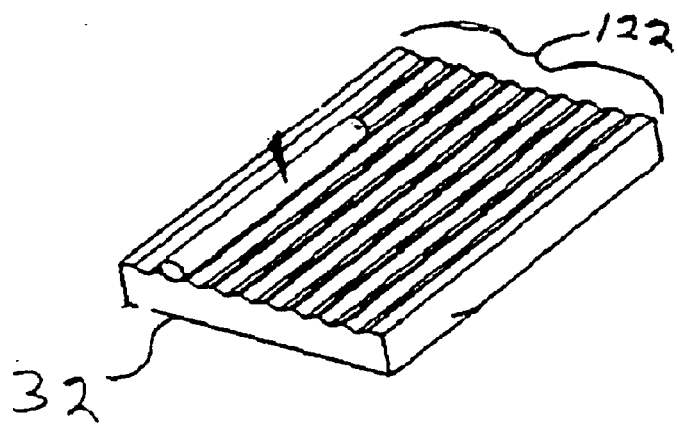
FIG. 9A shows a first grooved substrate.
Figure 9B:
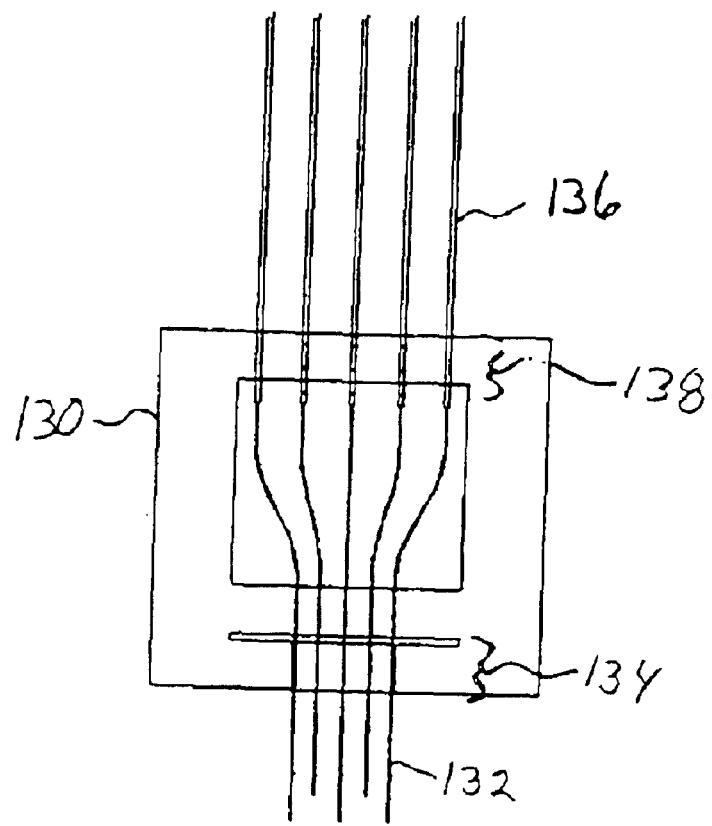
FIG. 9B shows a second grooved substrate.
Figure 11:
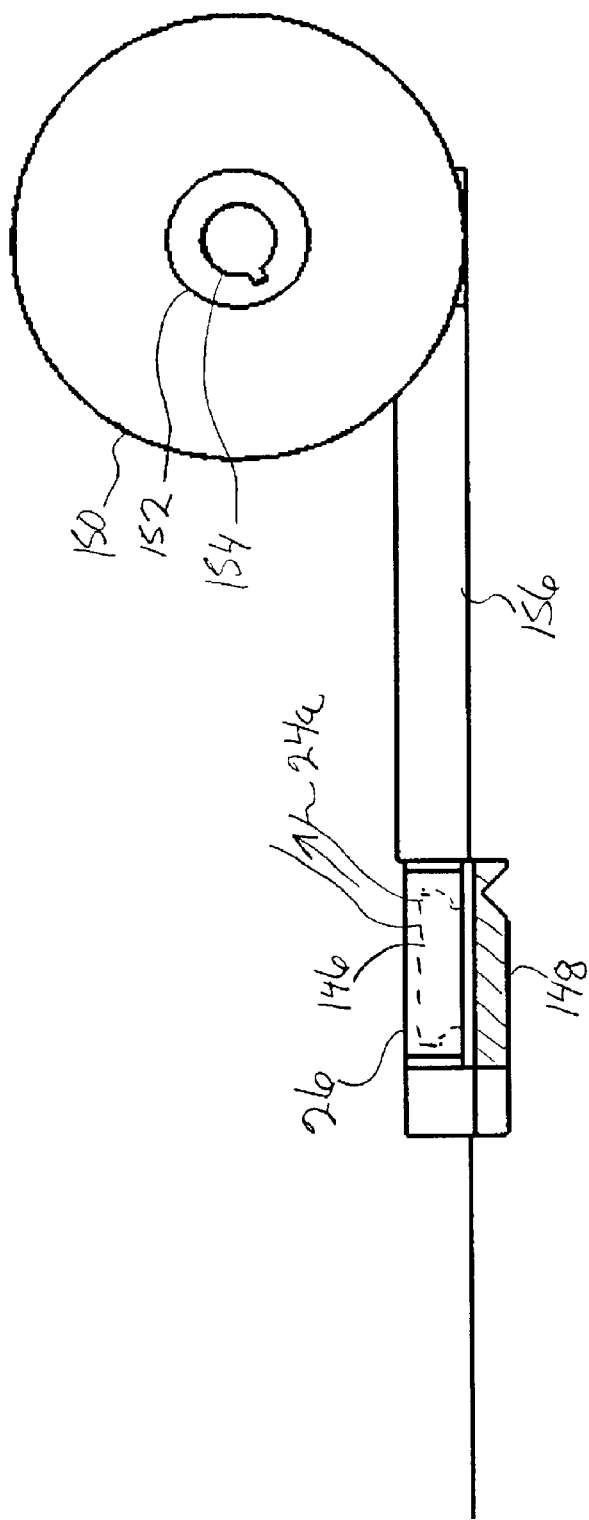
FIG. 11 shows a side view of the fiber magazine shown in FIG. 10.
Figure 12:
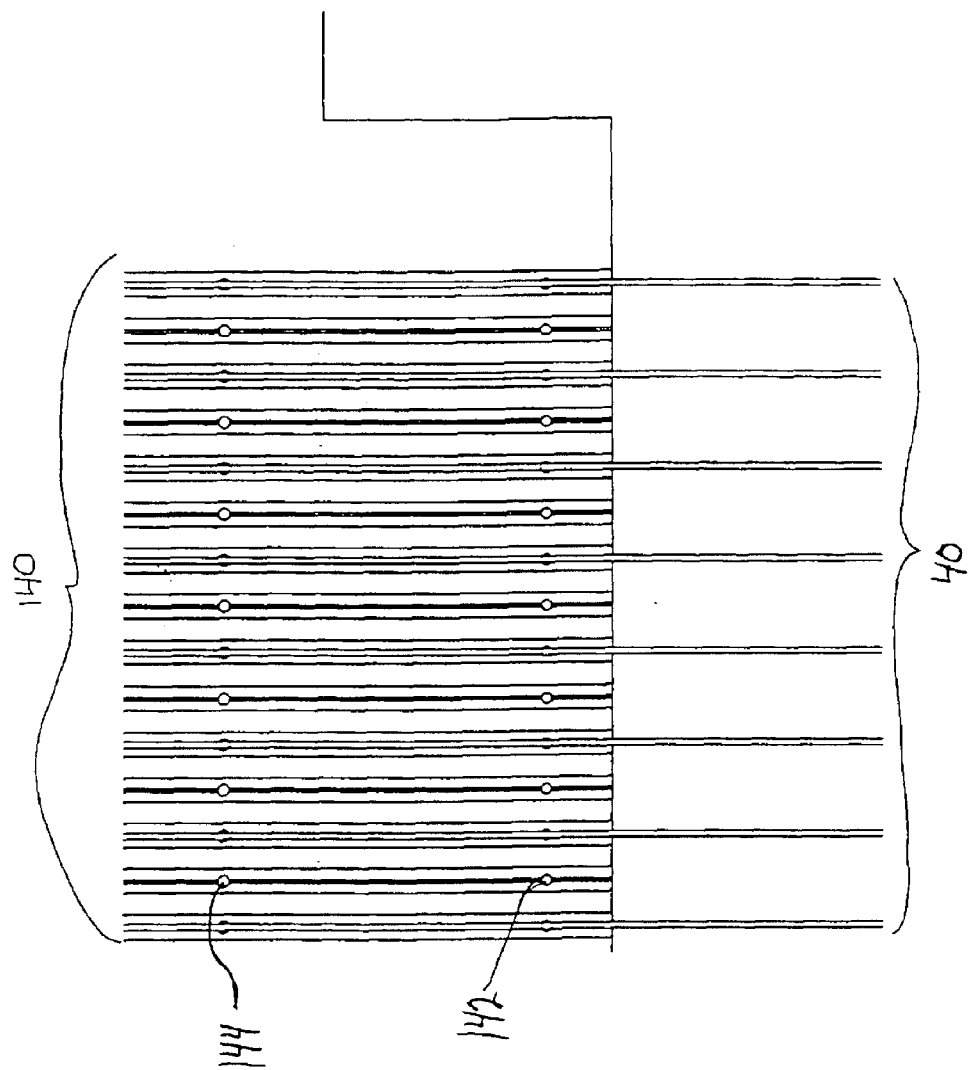
FIG. 12 shows a view of the bottom surface of the fiber magazine as shown in FIGS. 10 and 11.

Referring to FIGS. 9A–9B, substrate 32 includes a set of parallel grooves 122 formed from end-to-end in a top surface of substrate 32. Substrate 32 is typically used when placing fibers that are the same diameter for the entire length of the substrate. By contrast, substrate 130 is used when placing etched fibers onto a substrate in a "fan-out" placement pattern, i.e., placing an etched fiber end 132 in a first section 134 of relatively closely spaced substrate grooves at one end of a substrate 130, and placing a full diameter fiber section 136 into a second section 138 of more widely spaced set of grooves at the opposite end of substrate 130. When apparatus 10 is used to place etched fibers onto substrate 130, substrate carrier 22 is used to move substrate 130 into a first position for the placement of etched fiber section 132 into a closely spaced groove in first section 132 (when the front plunger 50 is extended and then retracted), then the substrate 130 is moved into a second position for placement of the full diameter fiber section 136 into a groove in second section 138 (when back plunger 52 is extended and then retracted). When apparatus 10 is used to place etched fibers the dimensions of grooves 120 and 120*a* formed at the tip of plunger 50 and 52, respectively, may be different. In more detail, in order to hold and place etched fiber sections and full diameter fiber sections, the width and/or depth of each of the grooved-tips 120 and 120*a* may be constructed with different dimensions.

Referring to FIGS. 8A, and 10–12, fiber magazine 26 includes a set of grooves 140 that are formed on the bottom surface of magazine 26 for holding fibers 40. Each groove in set of grooves 140 includes holes 142 and 144 that have been drilled into each groove and which connect to an airflow plenum chamber 146 (see FIG. 8A) formed through the central region of magazine 26. Before and during loading of magazine 26 onto magazine carrier 20, a holding cap 148 is clamped to the bottom surface of magazine 26 to hold fibers 40 within grooves 140. After magazine 26 is loaded onto magazine carrier 20, vacuum source 24 is connected and turned on to draw air from plenum 146, this causes air to be drawn through groove holes 142 and 144. The flow of air through groove holes 142 and 144 creates a differential force below fibers 40 that is greater than the force in the grooves 140, thereby holding the fibers 40 in place within grooves 140. Once the airflow is started, holding cap 148 is removed. During operation of apparatus of 10, each time placement head 16 (or 18) picks up a fiber end and places the fiber the corresponding fiber section held in one of the magazine grooves 140 is dislodged from the magazine groove. Therefore each populated substrate may be removed from apparatus 10 without having to remove fiber magazine 26 and without having to remove or dislodge fibers from magazine 26.

Fiber magazine 26 includes a fiber spool carrier 160 that is used to hold a set of spools 150 that are used to coil and hold the fiber "tails", i.e., the trailing lengths of each of the fibers 40 which are being manipulated by apparatus 10. Fiber spool carrier 160 is attached to the magazine 26 by support bar 156. Spools 150 are mounted on fiber spool carrier 160 by sliding a center opening in the center of each spool over an axle 154 mounted to the rear of support member 156. Spools 150 are held onto the axle 154 by retaining ring 152. After a substrate has been populated with fibers, the populated substrate and the spool (or spools) that are holding the corresponding fiber tails are slid off of axle 154. The combined assembly of substrate, fibers and spool (s) 150 may then be handled as a single unit for additional handling and processing. Each spool 150 may be used to hold several fiber tails or may hold only a single fiber tail.

Typically, after a substrate is populated with fibers an additional attachment means is applied to permanently attach fibers to substrate. For example, the fibers may be fused or soldered to the substrate, or an epoxy applied and cured. Furthermore, a holding cap (e.g., a flat substrate) may also be bonded over the fibers that are held within the substrate grooves. The tacking adhesive used to hold the placed and tacked fibers may be applied on the substrate in the placement area, or, to avoid clogging the plunger tips the tacking adhesive may be applied immediately behind or in front of the placement area.

The substrate holding area on the top surface of substrate pallet 30 may be used to hold a variety of different size substrates without modifying the dimensions of the substrate pallet.

Though we have described specific embodiments, we do not intend to imply that there are not other ways to implement some of the features of those embodiments. For example, we described manually loading the substrate pallet onto the substrate carrier and manually loading the fiber magazine onto the magazine carrier, however, one or both of these loading procedures could be automated using an appropriate automated parts handling system. We also described having an operator watch the camera output display and determine the appropriate movements for each of the movable stages and the plungers. However, CPU 100 could use the image inputs from camera 110 to determine the coordinates of the substrate grooves and/or the end of a fiber, and then determine the appropriate movements of the movable stages and/or the plungers.

We also discussed apparatus 10 being constructed with multiple placement heads that are used to place different sections of the same fiber onto different sections of a substrate. However, apparatus could be constructed with only one placement head that is used when placing fibers onto a substrate that are the same diameter for the corresponding length of a substrate, e.g., when placing non-etched fibers that do not require a fan-out pattern.

The specific embodiment of placing fiber into grooves of a substrate was discussed but the apparatus could also be used for placement of fibers onto a flat substrate, or a substrate with other surface features. Also, in addition to the method of tacking fibers with adhesive, other methods of tacking or temporary clamping could be used to hold the fibers immediately after placement, for example, soldering, fusing, mechanical stops, airflow, or combinations of these methods.

A number of embodiments of the invention have been described. Nevertheless; it will be understood that various modifications may be made without departing from the spirit and scope of the invention. Accordingly, other embodiments are within the scope of the following claims.

What is claimed is:

1. An apparatus for placing a fiber on a substrate, the apparatus comprising:

a base;

a supporting member attached to the base;

a first placement head attached to the supporting member, the first placement head having an extendable plunger slidably coupled to the first placement head, the first placement head having an airflow channel formed proximate to a tip of the plunger;

a substrate holder attached to the base, a separate fiber holder attached to the supporting member, wherein, during operation of the apparatus, the substrate holder holds a substrate beneath the plunger, the substrate including grooves and wherein during operation the fiber holder holds the fiber in a groove formed in a bottom surface of the fiber holder between the plunger and a substrate groove, and wherein the fiber holder holds the fiber in longitudinal alignment with the tip of the plunger and the substrate groove; and wherein, during operation of the apparatus, a vacuum source draws a flow of air through the airflow channel, and wherein, during operation of the apparatus, the placement head picks up and holds a fiber against the plunger tip using forces associated with the flow of air.

2. The apparatus of claim 1, wherein the substrate holder comprises a movable stage configured to move beneath and perpendicular to the first placement head, and wherein, during operation of the apparatus, the longitudinal axis of the substrate grooves are held parallel to the longitudinal axis of the fiber and the plunger.

3. The apparatus of claim 2, wherein the substrate holder further comprises:
   a removable substrate pallet,
   wherein during operation of the apparatus, the substrate is held on the substrate pallet and the substrate pallet is held on the substrate holder.

4. The apparatus of claim 1, wherein the plunger further comprises:
   a groove-shaped tip, wherein during operation of the apparatus, the fiber is drawn against the groove-shaped tip by forces associated with the flow of air through the first placement head.

5. The apparatus of claim 2, wherein the apparatus further comprises:
   a second placement head attached to the supporting member, the second placement head having a second extendable plunger slidably coupled to the second placement head, the second placement head having a second airflow channel formed proximate to a tip of the second plunger, wherein the second plunger is longitudinally aligned with the fiber held by the fiber holder and the grooves of the substrate held by the substrate holder,
   the second extendable plunger further comprising:
   a groove-shaped tip, wherein during operation of the apparatus, the vacuum source draws a flow of air through the second airflow channel and the second placement head picks up a section of the fiber and holds the fiber within the groove-shaped tip of the second plunger by forces associated with a flow of air through the second placement head.

6. The apparatus of claim 1, wherein the fiber holder comprises a movable stage configured to move perpendicular to the first placement head.

7. The apparatus of claim 6, wherein the fiber holder further comprises:
   a removable fiber magazine, wherein during operation of the apparatus, the fiber magazine holds a plurality of fibers and the fiber magazine is held on the fiber holder.

8. The apparatus of claim 7, wherein the fiber magazine further comprises:
   a plurality of grooves formed in a bottom surface of the magazine, each of the plurality of grooves holding one of the plurality of fibers; and
   at least one airflow hole formed in the bottom of each of the plurality of grooves,
   wherein during operation of the apparatus, a vacuum source draws a flow of air through the airflow holes and holds each of the plurality of fibers within a corresponding one of the plurality of grooves.

9. An apparatus for handling optical fibers, comprising:
   a fiber magazine having a plurality of grooves formed in a surface of the magazine, wherein during operation of the apparatus, each of the plurality of grooves holds one of the plurality of fibers; at least one airflow hole formed in the bottom of each of the plurality of grooves,
   a plunger, and
   a substrate holder,
   wherein, during operation of the apparatus, the substrate holder holds a substrate, the substrate including grooves, and
   wherein during operation of the apparatus, a vacuum source draws a flow of air through the airflow holes, the forces associated with the flow of air holding the fibers within the plurality of grooves, and
   wherein during operation the fiber magazine is positioned between the plunger and a substrate groove, and wherein the fiber magazine holds the fiber in longitudinal alignment with a tip of the plunger and the substrate groove.

10. The apparatus of claim 9, wherein the fiber magazine further comprises:
    an airflow plenum formed in a central region of the magazine, the airflow plenum connected to one or more of the airflow holes formed in the grooves,
    wherein, during operation of the apparatus, a vacuum source draws air from the plenum and from the airflow holes.

11. The apparatus of claim 10, wherein, during operation of the apparatus, an end of each of the plurality of fibers is held protruding beyond a front edge of the fiber magazine, and wherein, each time the end of a fiber is placed by the apparatus the corresponding fiber being held in the corresponding magazine groove is dislodged from the magazine groove.

12. The apparatus of claim 10, wherein the fiber magazine comprises a removable fiber magazine.

13. The apparatus of claim 10, further comprising:
    an axle for holding spools, wherein during operation, at least one spool is placed on the axle, each spool holding an opposite end of a fiber that is being held within one of the plurality of grooves.

14. The apparatus of claim 13, wherein the spools are removable from the fiber magazine.

15. A method of placing a fiber on a substrate, comprising:
    holding a substrate having a groove beneath a first placement head;
    flowing air past a plunger slidably coupled to the first placement head;
    positioning a fiber magazine between the plunger and the substrate groove;
    holding the fiber in longitudinal alignment with a tip of the plunger and the substrate groove;
    picking up and holding a fiber against the plunger tip using forces associated with the flow of air; and
    extending the plunger to place the fiber into the substrate groove.

16. The method of claim 15, further comprises:
    moving the substrate with a first movable stage, the first movable stage configured to move beneath and perpendicular to the first placement head.

17. The method of claim 16, wherein holding a substrate having a groove further comprises:
    holding a longitudinal axis of the substrate groove parallel to the longitudinal axis of the fiber and the plunger.

18. The method of claim 16, wherein moving the substrate with a movable stage further comprises:
    holding the substrate on a removable substrate pallet; and
    holding the removable substrate on the first movable stage.

19. The method of claim 16, further comprises:
    holding a fiber between the plunger and the substrate in longitudinal alignment with the plunger tip and the substrate groove.

20. The method of claim 16, wherein picking up and holding a fiber against a tip of the plunger further comprises:

picking and holding a fiber against a groove-shaped tip.

21. The method of claim 20, wherein flowing air further comprises:

flowing air through a channel formed proximate to the groove-shaped tip; and drawing air through the channel during operation of the apparatus.

22. The method of claim 21, further comprises:

holding the substrate having a groove beneath a second placement head;

flowing air past a second plunger slidably coupled to the second placement head;

picking up and holding a fiber against a tip of the second plunger using forces associated with the flow of air; and extending the plunger to place the fiber into a second substrate groove.

23. The method of claim 19, wherein holding a fiber further comprises:

holding a fiber with a fiber magazine; and moving the fiber magazine with a movable stage configured to move perpendicular to the first placement head.

24. The method of claim 23, further comprises:

holding a plurality of fibers with the fiber magazine.

25. A method of presenting optical fibers to an apparatus, comprising:

holding a plurality of fibers within a plurality of grooves formed in a surface of a fiber magazine;

positioning the fiber magazine between a plunger and a substrate groove; and holding the fiber in longitudinal alignment with a tip of the plunger and the substrate groove;

wherein holding further comprises:

drawing air through at least one airflow hole formed in the bottom of each of the plurality of grooves, the forces associated with the flow of air being used to hold the fibers within the plurality of grooves.

26. The method of claim 25, wherein drawing air further comprises:

drawing air through an airflow plenum formed in a central region of the fiber magazine, the airflow plenum connected to one or more of the airflow holes formed in the grooves.

27. The method of claim 25, wherein holding a plurality of fibers further comprises:

holding an end of each of the plurality of fibers to protrude beyond a front edge of the fiber magazine, and dislodging a fiber from a one of the plurality of grooves each time an end of the corresponding fiber is manipulated by the apparatus.

28. The method of claim 25, further comprising:

mounting at least one spool proximate to the fiber magazine, each spool holding an opposite end of a fiber that is being held within one of the plurality of grooves, wherein the spool is removable from the fiber magazine.

\* \* \* \* \*